United States Patent
Miyahara (10) Patent No.: US 8,717,614 B2
(45) Date of Patent: May 6, 2014

(54) IMAGE FORMING APPARATUS AND IMAGE FORMING METHOD

(71) Applicant: KYOCERA Document Solutions Inc., Osaka (JP)

(72) Inventor: Norifumi Miyahara, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 13/686,735

(22) Filed: Nov. 27, 2012

(65) Prior Publication Data

US 2013/0135662 A1 May 30, 2013

(30) Foreign Application Priority Data

Nov. 29, 2011 (JP) .................................. 2011-261059

(51) Int. Cl.
*G06K 15/00* (2006.01)
*G06F 3/12* (2006.01)
*G06K 15/02* (2006.01)

(52) U.S. Cl.
CPC .......... *G06F 3/1296* (2013.01); *G06K 15/1851* (2013.01)
USPC ........................................ 358/1.17; 358/1.14

(58) Field of Classification Search
CPC combination set(s) only.
See application file for complete search history.

(56) References Cited

U.S. PATENT DOCUMENTS

| 7,376,083 | B2* | 5/2008 | Ignatowski et al. | 370/232 |
|---|---|---|---|---|
| 8,046,769 | B2* | 10/2011 | Masuda et al. | 718/105 |
| 2004/0263873 | A1 | 12/2004 | Sato et al. | |
| 2010/0002251 | A1* | 1/2010 | Tachibana | 358/1.15 |
| 2010/0091319 | A1* | 4/2010 | Mandel | 358/1.15 |
| 2011/0075202 | A1 | 3/2011 | Shirai | |

FOREIGN PATENT DOCUMENTS

| JP | 2005-24729 A | 1/2005 |
|---|---|---|
| JP | 2008-254228 A | 10/2008 |
| JP | 2011-77674 A | 4/2011 |

* cited by examiner

*Primary Examiner* — Firmin Backer
*Assistant Examiner* — Lennin Rodriguezgonzalez
(74) *Attorney, Agent, or Firm* — Knobbe Martens Olson & Bear LLP (57) ABSTRACT

An image forming apparatus of the present disclosure includes a print queue, a job writing unit, a print execution unit, a connected-state detection unit, and a maximum-number-of-storable-pages changing unit. The print queue stores print jobs on a page basis. The job writing unit writes the print jobs into the print queue. The print execution unit executes print on a recording medium based on a page from the print queue, and suspends execution of the print in a case in which a print job other than a print job of currently executed printing is cancelled. The connected-state detection unit detects a connected state of extension devices affecting a length of a conveyance path of the recording medium. The maximum-number-of-storable-pages changing unit changes a maximum number of storable pages, that can be stored in the print queue, and changes the maximum number of storable pages, based on the connected state detected.

4 Claims, 12 Drawing Sheets

FIG. 1

FIG. 3      13a CORRESPONDING RELATIONSHIP

| CONNECTED STATE | MAXIMUM NUMBER OF STORABLE PAGES |
|---|---|
| NO CONNECTION | 8 |
| ONLY MEDIUM FEED UNIT | 10 |
| ONLY POST PROCESSING UNIT | 10 |
| MEDIUM FEED UNIT AND POST PROCESSING UNIT | 12 |

FIG. 4

21 PRINT QUEUE

| NUMBER | JOB ID | PAGE | STATUS |
|---|---|---|---|
| 10 | | | |
| 9 | | | |
| 8 | Job B | 3 | WAITING |
| 7 | Job B | 2 | WAITING |
| 6 | Job B | 1 | WAITING |
| 5 | Job A | 5 | WAITING |
| 4 | Job A | 4 | WAITING |
| 3 | Job A | 3 | WAITING |
| 2 | Job A | 2 | WAITING |
| 1 | Job A | 1 | PRINTING |

21 PRINT QUEUE

| NUMBER | JOB ID | PAGE | STATUS |
|---|---|---|---|
| 12 | | | |
| 11 | | | |
| 10 | | | |
| 9 | | | |
| 8 | | | |
| 7 | | | |
| 6 | | | |
| 5 | | | |
| 4 | | | |
| 3 | | | |
| 2 | | | |
| 1 | | | |

21 PRINT QUEUE

| NUMBER | JOB ID | PAGE | STATUS |
|---|---|---|---|
| 10 | JobC | 2 | WAITING |
| 9 | JobC | 1 | WAITING |
| 8 | JobB | 3 | WAITING |
| 7 | JobB | 2 | WAITING |
| 6 | JobB | 1 | WAITING |
| 5 | JobA | 5 | WAITING |
| 4 | JobA | 4 | WAITING |
| 3 | JobA | 3 | WAITING |
| 2 | JobA | 2 | WAITING |
| 1 | JobA | 1 | PRINTING |

21 PRINT QUEUE

| NUMBER | JOB ID | PAGE | STATUS |
|---|---|---|---|
| 1 0 | | | |
| 9 | | | |
| 8 | | | |
| 7 | J o b B | 3 | WAITING |
| 6 | J o b B | 2 | WAITING |
| 5 | J o b B | 1 | WAITING |
| 4 | J o b A | 5 | WAITING |
| 3 | J o b A | 4 | WAITING |
| 2 | J o b A | 3 | WAITING |
| 1 | J o b A | 2 | WAITING |

FIG. 10B

21 PRINT QUEUE

| NUMBER | JOB ID | PAGE | STATUS |
|---|---|---|---|
| 10 | | | |
| 9 | | | |
| 8 | | | |
| 7 | | | |
| 6 | | | |
| 5 | | | |
| 4 | JobA | 5 | WAITING |
| 3 | JobA | 4 | WAITING |
| 2 | JobA | 3 | WAITING |
| 1 | JobA | 2 | WAITING |

FIG. 11

IMAGE FORMING APPARATUS AND IMAGE FORMING METHOD

This application is based on and claims the benefit of priority from Japanese Patent Application No. 2011-261059, filed on 29 Nov. 2011, the content of which is incorporated herein by reference.

BACKGROUND

The present disclosure relates to an image forming apparatus and an image forming method, both of which execute print on a recording medium.

Conventionally, as an image forming apparatus that executes print on a recording medium, a printer has been known, which includes: a print queue that stores print jobs on a page basis; and a CPU that writes print jobs into the print queue, and executes print on a paper sheet, based on a page being sequentially read from the print queue. In a case in which a print job other than a print job of currently executed printing is cancelled from among the print jobs stored in the print queue, the CPU suspends execution of the print.

The print queue is a storage area for smoothly executing print. Therefore, the maximum number of pages that can be stored into the print queue (hereinafter referred to as "maximum number of storable pages") is preferably larger than the number of sheets of recording media that can be concurrently conveyed in an image forming apparatus. Here, the number of sheets of recording media that can be concurrently conveyed in the image forming apparatus is determined depending on the length of the conveyance path of the recording medium in the image forming apparatus. More specifically, the optimum maximum number of storable pages is determined depending on the length of the conveyance path of the recording medium in the image forming apparatus.

Here, in a case in which extension devices are connected to the image forming apparatus, the length of the conveyance path of the recording medium is increased. The extension devices include an external medium feed unit that supplies a recording medium to the image forming apparatus, and a post processing unit that executes post processing such as sorting and stapling of the recording medium printed by the image forming apparatus.

Accordingly, in general, the maximum number of storable pages is fixed to an optimum number for each type of image forming apparatus, depending on the length of the conveyance path of the recording medium in the image forming apparatus (more specifically, the maximum length of the conveyance path of the recording medium in the image forming apparatus) in a state where all extension devices affecting the length of the conveyance path of the recording medium are connected thereto.

As described above, in a case in which a print job other than a print job of currently executed printing is cancelled from among the print jobs stored in the print queue, the conventional image forming apparatus suspends execution of the print. Here, as the maximum number of storable pages is increased, the number of print jobs stored in the print queue is likely to be increased. Therefore, in the conventional image forming apparatus, as the maximum number of storable pages is increased, execution of print is more likely to be suspended due to cancellation of a print job other than a print job of currently executed printing. More specifically, in the conventional image forming apparatus, it is preferable for the maximum number of storable pages to be not larger than necessary, in order to reduce the possibility of suspension of print due to cancellation of a print job other than a print job of currently executed printing.

However, in the conventional image forming apparatus, the maximum number of storable pages is fixed depending on the length of the conveyance path of the recording medium (more specifically, the maximum length of the conveyance path of the recording medium in the image forming apparatus) in a state where the extension devices affecting the length of the conveyance path of the recording medium are connected thereto. This results in a problem that the maximum number of storable pages is too large, in a case in which no extension devices affecting the length of the conveyance path of the recording medium are connected thereto.

SUMMARY

An image forming apparatus of the present disclosure includes a print queue, a job writing unit, a print execution unit, a connected-state detection unit, and a maximum-number-of-storable-pages changing unit. The print queue stores print jobs on a page basis. The job writing unit writes the print jobs into the print queue. The print execution unit executes print on a recording medium based on a page being sequentially read from the print queue, and suspends execution of the print in a case in which a print job other than a print job of currently executed printing is cancelled from among the print jobs stored in the print queue. The connected-state detection unit detects a connected state of extension devices affecting the length of the conveyance path of the recording medium. The maximum-number-of-storable-pages changing unit changes a maximum number of storable pages as a maximum number of pages that can be stored in the print queue, and changes the maximum number of storable pages, based on the connected state detected by the connected-state detection unit.

An image forming method of the present disclosure includes a job writing step, a print executing step, a connected-state detecting step, and a maximum-number-of-storable-pages changing step. The job writing step writes print jobs into a print queue that stores the print jobs on a page basis. The print executing step executes print on a recording medium based on a page being sequentially read from the print queue, and suspends execution of the print in a case in which a print job other than a print job of currently executed printing is cancelled from among the print jobs stored in the print queue. The connected-state detecting step detects a connected state of extension devices affecting the length of the conveyance path of the recording medium. The maximum-number-of-storable-pages changing step changes a maximum number of storable pages as a maximum number of pages that can be stored in the print queue, and changes the maximum number of storable pages, based on the connected state detected in the connected-state detecting step.

DETAILED DESCRIPTION

Descriptions are hereinafter provided for embodiments of the present disclosure with reference to the drawings.

First Embodiment

First of all, descriptions are provided for a configuration of an image forming apparatus according to the present embodiment.

Figure 1:
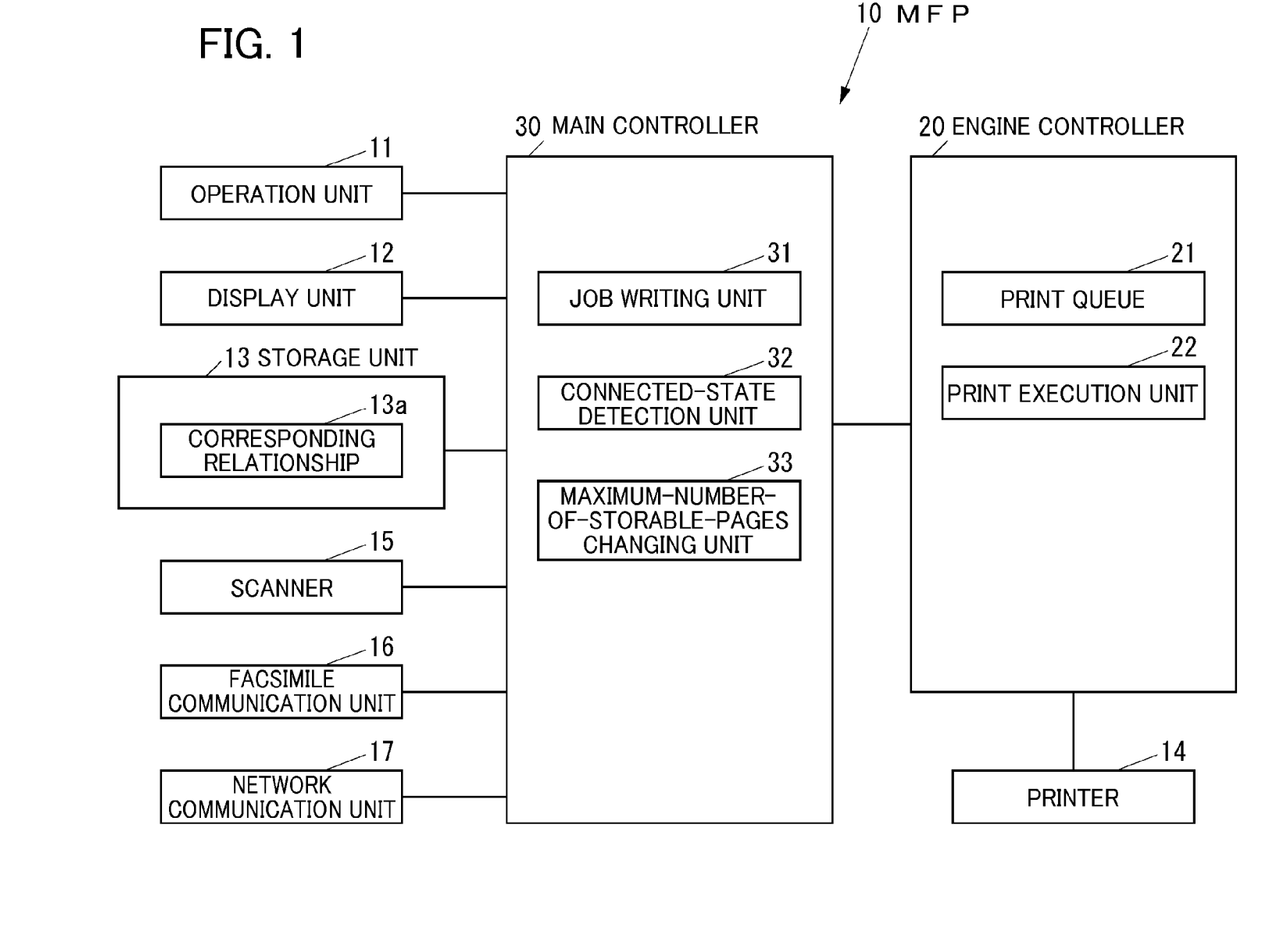
FIG. 1 is a block diagram of an MFP according to a first embodiment of the present disclosure.
Figure 2:
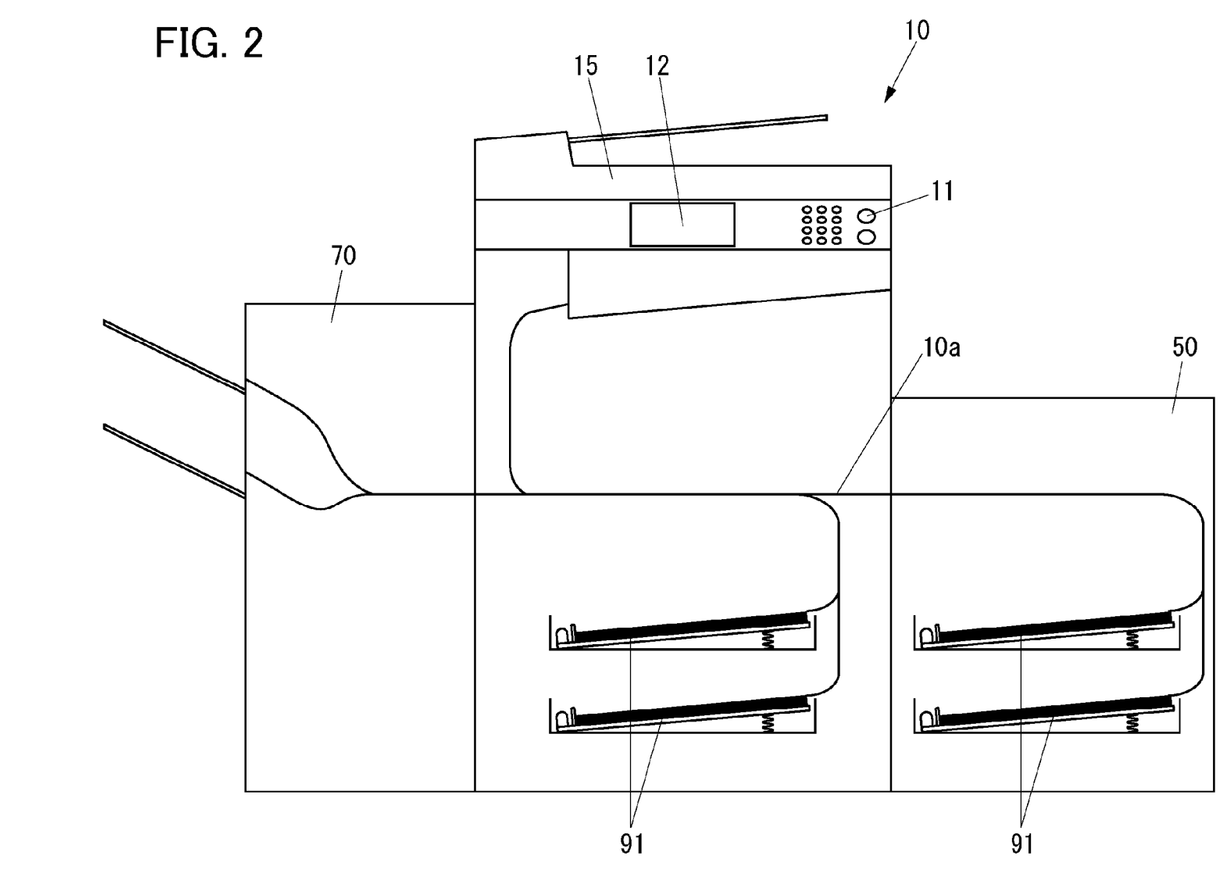
FIG. 2 is a configuration diagram of the MFP shown in FIG. 1.

FIG. 1 is a block diagram of an MFP (Multifunction Peripheral) 10 as the image forming apparatus according to the present embodiment. FIG. 2 is a configuration diagram of the MFP 10.

As shown in FIGS. 1 and 2, the MFP 10 includes an operation unit 11, a display unit 12, a storage unit 13, a printer 14, a scanner 15, a facsimile communication unit 16, a network communication unit 17, an engine controller 20, and a main controller 30. The operation unit 11 is an input device such as buttons for inputting various operations by a user. The display unit 12 is a display device such as an LCD (Liquid Crystal Display) that displays a variety of information. The storage unit 13 is a storage device such as EEPROM (Electrically Erasable Programmable Read Only Memory) and an HDD (Hard Disk Drive), which store programs and a variety of information. The printer 14 is a print device that executes print on a recording medium 91 such as a paper sheet. The scanner 15 is a reading device that reads an image from an original. The facsimile communication unit 16 is a facsimile device that performs facsimile communication with an external facsimile device (not shown) via a communication line such as a public telephone line. The network communication unit 17 is a network communication device that communicates with an external device such as a PC (Personal Computer) via a network such as a LAN (Local Area Network) and the Internet. The engine controller 20 controls the printer 14. The main controller 30 controls the entirety of the MFP 10.

The MFP 10 can be used alone, and can also be used by being connected to at least one of a medium feed unit 50 and a post processing unit 70. The medium feed unit 50 is an extension device that supplies the recording medium 91 to the MFP 10. The post processing unit 70 is an extension device that executes post processing such as sorting and stapling of the recording medium 91 printed by the MFP 10. The medium feed unit 50 and the post processing unit 70 are the extension devices that affect the length of a conveyance path 10a of the recording medium 91.

The storage unit 13 stores a connected state of the medium feed unit 50 and the post processing unit 70, as well as a corresponding relationship 13a in terms of the maximum number of storable pages. The storage unit 13 configures a corresponding-relationship storage unit of the present disclosure. The maximum number of storable pages is the maximum number of pages that can be stored by a print queue 21 (to be described later).

Figure 3:
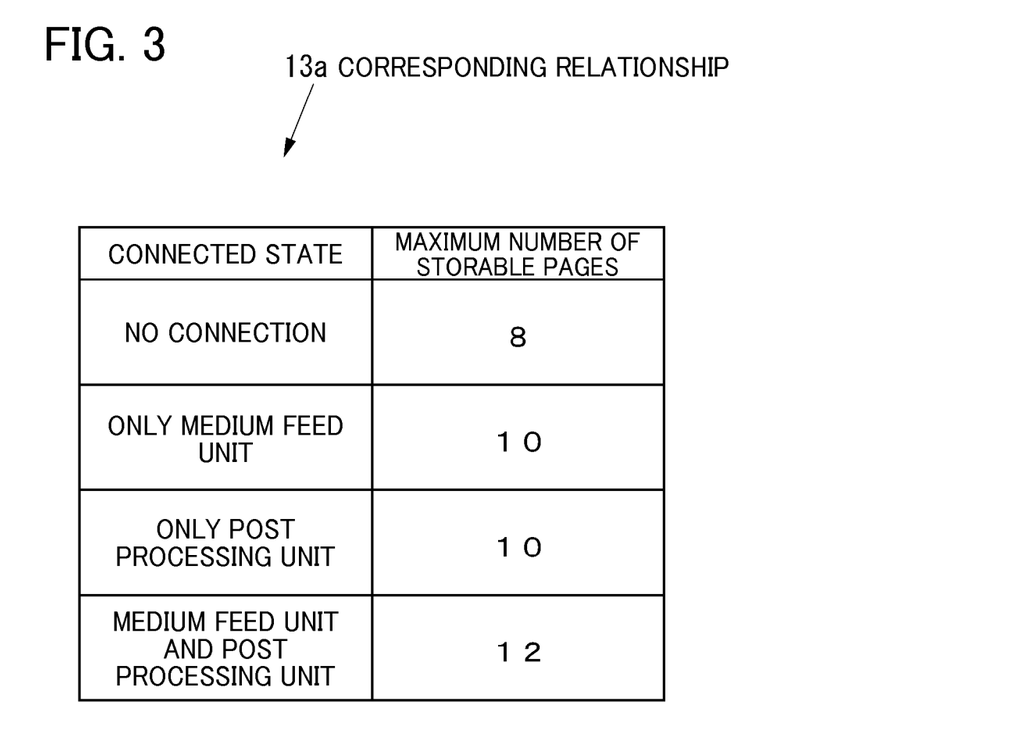
FIG. 3 is a table showing an example of contents of a corresponding relationship shown in FIG. 1.

FIG. 3 is a table showing an example of contents of the corresponding relationship 13a.

The corresponding relationship 13a shown in FIG. 3 describes the maximum number of storable pages as follows. The maximum number of storable pages is "8" in a case in which none of the medium feed unit 50 and the post processing unit 70 is connected to the MFP 10. The maximum number of storable pages is "10" in a case in which only the medium feed unit 50 among the medium feed unit 50 and the post processing unit 70 is connected to the MFP 10. The maximum number of storable pages is "10" in a case in which only the post processing unit 70 among the medium feed unit 50 and the post processing unit 70 is connected to the MFP 10. The maximum number of storable pages is "12" in a case in which both of the medium feed unit 50 and the post processing unit 70 are connected to the MFP 10.

The corresponding relationship 13a may be installed in the MFP 10 in the manufacturing phase of the MFP 10, or may be additionally installed to the MFP 10 from a storage medium such as USB (Universal Serial Bus) memory or an SD memory card, or from a network, or may be generated by an operation via the operation unit 11.

The engine controller 20 shown in FIG. 1 includes, for example: a CPU (Central Processing Unit); ROM (Read Only Memory) that stores programs and a variety of information in advance; and RAM (Random Access Memory) that is used as a working area of the CPU. The CPU executes a program stored in the ROM or the storage unit 13.

The engine controller 20 can create the print queue 21 on the RAM, in which the print queue 21 stores a print job on a page basis.

Examples of the print job stored in the print queue 21 include, for example: a print job of a copy that is based on an image being read from an original by the scanner 15; a facsimile print job that is based on an image being received through facsimile from an external facsimile device via the communication unit 16; and a print job that is based on print data being received from an external computer via the network communication unit 17.

Figure 4:
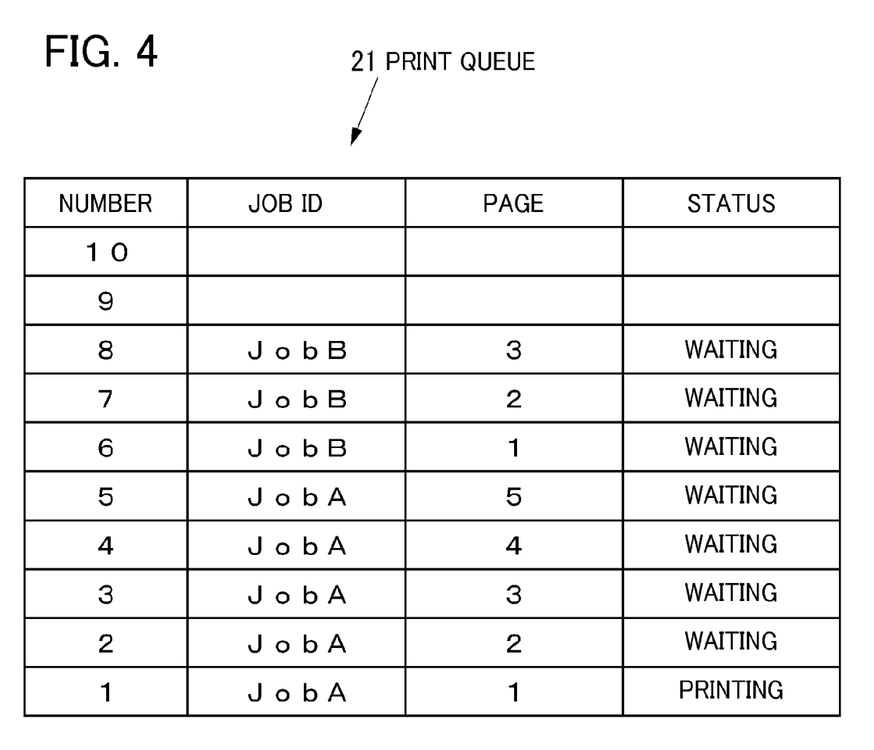
FIG. 4 is a table showing an example of contents of a print queue shown in FIG. 1.

FIG. 4 is a table showing an example of contents of the print queue 21.

As shown in FIG. 4, the print queue 21 stores, for example, a print job number, a job ID as a print job ID, a print job page, and a print job state. The print job number is from "1" to the maximum number of storable pages. The printer 14A prints pages in an ascending order of the print job numbers. The print job status includes, for example, "printing" indicating that the printing is currently executed, and "waiting" indicating that the printing is waiting to be executed.

The print queue 21 shown in FIG. 4 includes a print job including five pages in total with a job ID "Job A", followed by a print job including three pages in total with a job ID "Job B". The first page of the print job with the job ID "Job A" is currently printed by the printer 14.

As shown in FIG. 1, the engine controller 20 functions as a print execution unit 22. By executing a program stored in the ROM or the storage unit 13, the print execution unit 22 causes the printer 14 to print a page, which is sequentially read from the print queue 21, on the recording medium 91.

The main controller 30 includes, for example: the CPU; the ROM that stores programs and a variety of information in advance; and the RAM that is used as a working area of the CPU. The CPU executes a program stored in the ROM or the storage unit 13.

By executing a program stored in the ROM or the storage unit 13, the main controller 30 functions as a job writing unit 31, a connected-state detection unit 32, and a maximum-number-of-storable-pages changing unit 33. The job writing unit 31 writes a print job into the print queue 21. The connected-state detection unit 32 detects a connected state of the medium feed unit 50 and the post processing unit 70. The maximum-number-of-storable-pages changing unit 33 changes the maximum number of storable pages of the print queue 21.

Next, descriptions are provided for operations of the MFP 10.

Changing the Maximum Number of Storable Pages of the Print Queue 21

Figure 5:
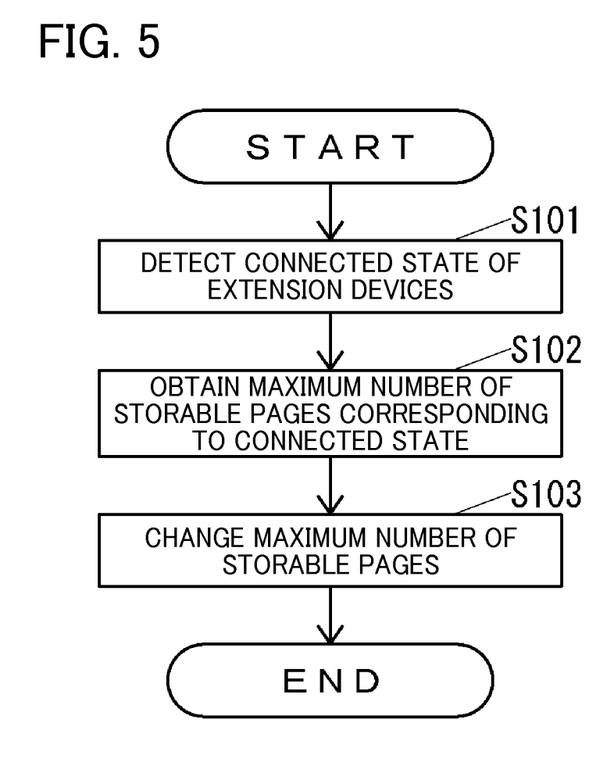
FIG. 5 is a flowchart of operations of a main controller shown in FIG. 1, in a case of changing a maximum number of storable pages of the print queue.

When the MFP 10 is turned on, the main controller 30 executes operations shown in FIG. 5.

FIG. 5 is a flowchart of the operations of the main controller 30 in a case of changing the maximum number of storable pages of the print queue 21.

As shown in FIG. 5, the connected-state detection unit 32 of the main controller 30 detects a connected state of the medium feed unit 50 and the post processing unit 70 (S101).

Subsequently, the maximum-number-of-storable-pages changing unit 33 of the main controller 30 obtains the maximum number of storable pages corresponding to the connected state detected in S101, based on the corresponding relationship 13a stored in the storage unit 13 (S102).

Subsequently, the maximum-number-of-storable-pages changing unit 33 changes the maximum number of storable pages of the print queue 21 to the maximum number of storable pages obtained in S102 (S103), and terminates the operations shown in FIG. 5.

Figure 6:
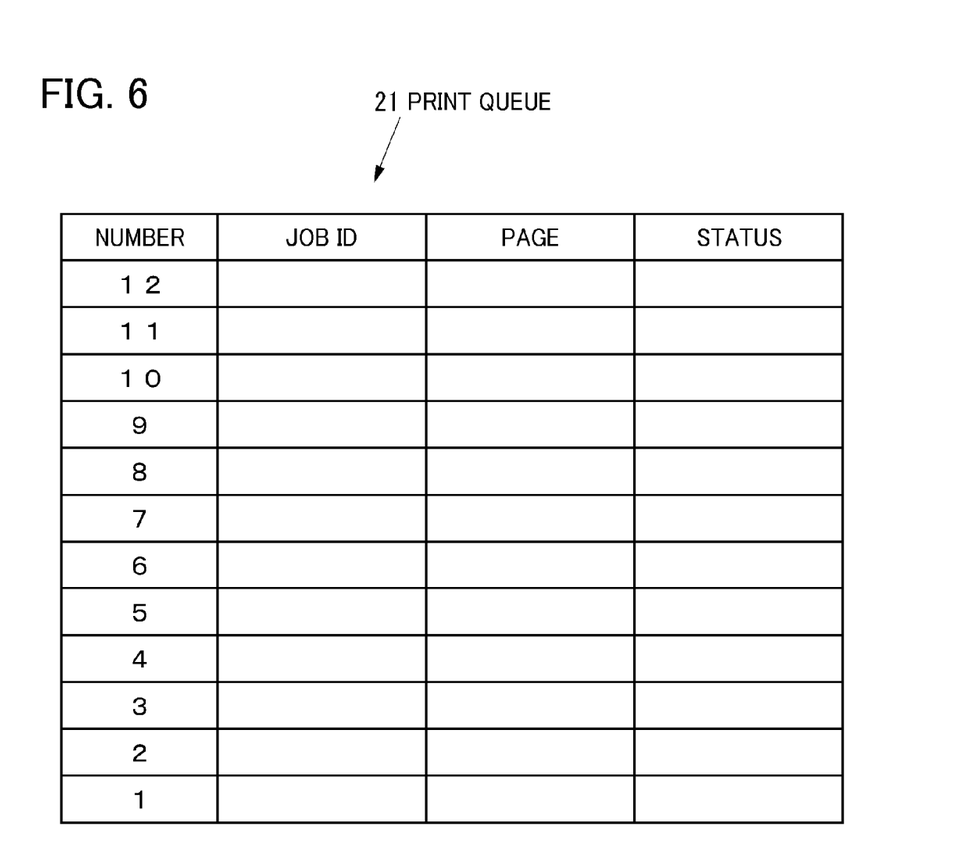
FIG. 6 is a table showing an example of contents of the print queue shown in FIG. 1, in a case of changing the maximum number of storable pages.

For example, as shown in FIG. 6, the maximum number of storable pages of the print queue 21 is "12" in a case in which both of the medium feed unit 50 and the post processing unit 70 are connected to the MFP 10.

Writing a Print Job into the Print Queue 21

When a print job occurs, the main controller 30 manages the print job in a chronological order until the writing of the print job to the print queue 21 is completed.

Figure 7:
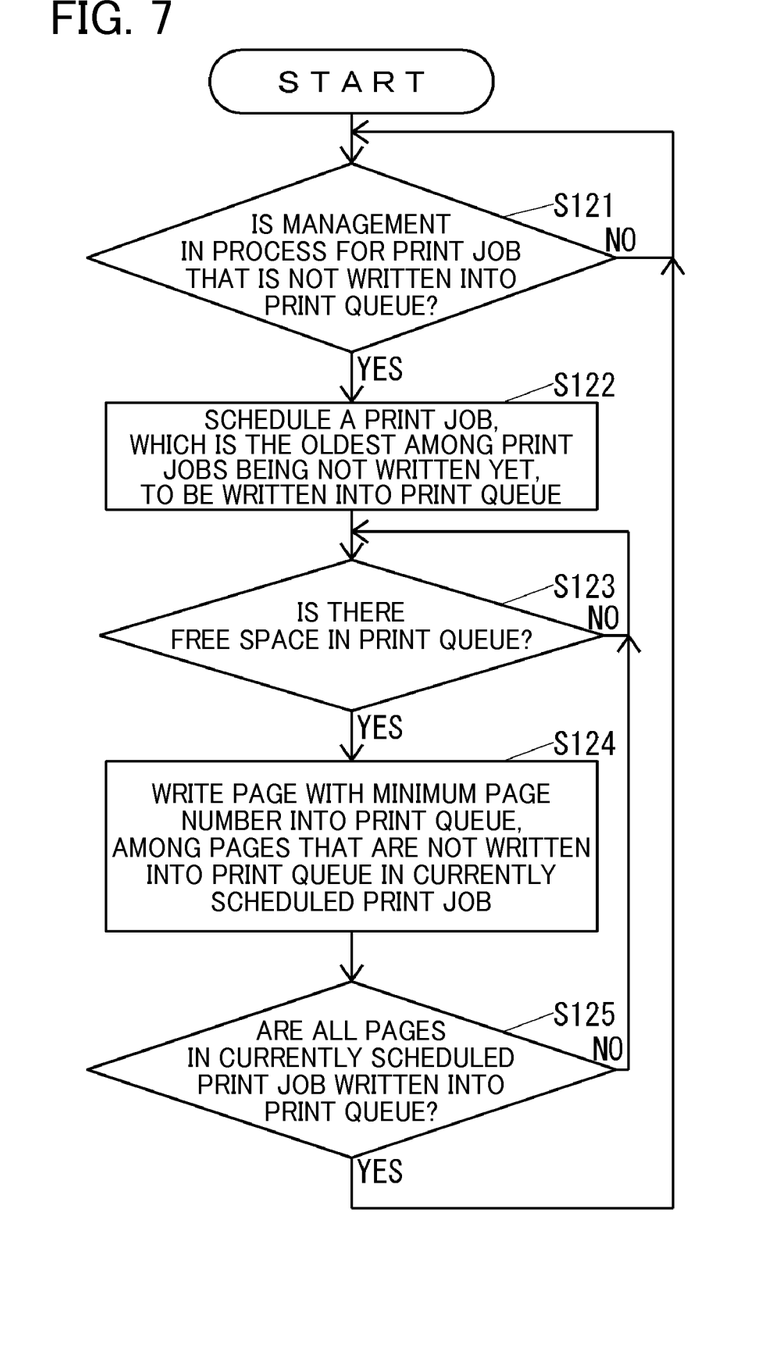
FIG. 7 is a flowchart of operations of the main controller shown in FIG. 1, in a case of writing print jobs into the print queue.

FIG. 7 is a flowchart of operations of the main controller 30 when a print job is written into the print queue 21.

As shown in FIG. 7, the job writing unit 31 of the main controller 30 continues determination as to whether management is in process for a print job that is not written into the print queue 21, until determining that management is in process for a print job that is not written into the print queue 21 (S121).

In a case in which the job writing unit 31 determines that management is in process for a print job that is not written into the print queue 21 in Step S121, then a print job, which is the oldest among print jobs being not written yet, is scheduled to be written into the print queue 21 (S122).

Subsequently, the job writing unit 31 continues determination as to whether there is free space in the print queue 21, until determining that there is free space in the print queue 21 (S123).

In a case in which the job writing unit 31 determines that there is free space in the print queue 21 in Step S123, among pages that are not written into the print queue 21 in a currently scheduled print job, a page with the minimum page number is written into the print queue 21 (S124).

Subsequently, the job writing unit 31 determines whether all pages in a currently scheduled print job are written into the print queue 21 (S125).

In a case in which the job writing unit 31 determines that there is a page being not written into the print queue 21 in a currently scheduled print job in Step S125, the processing in Step S123 is executed again.

On the other hand, in a case in which the job writing unit 31 determines that all pages in a currently scheduled print job are written into the print queue 21 in Step S125, the processing in Step S121 is executed again.

Figure 8:
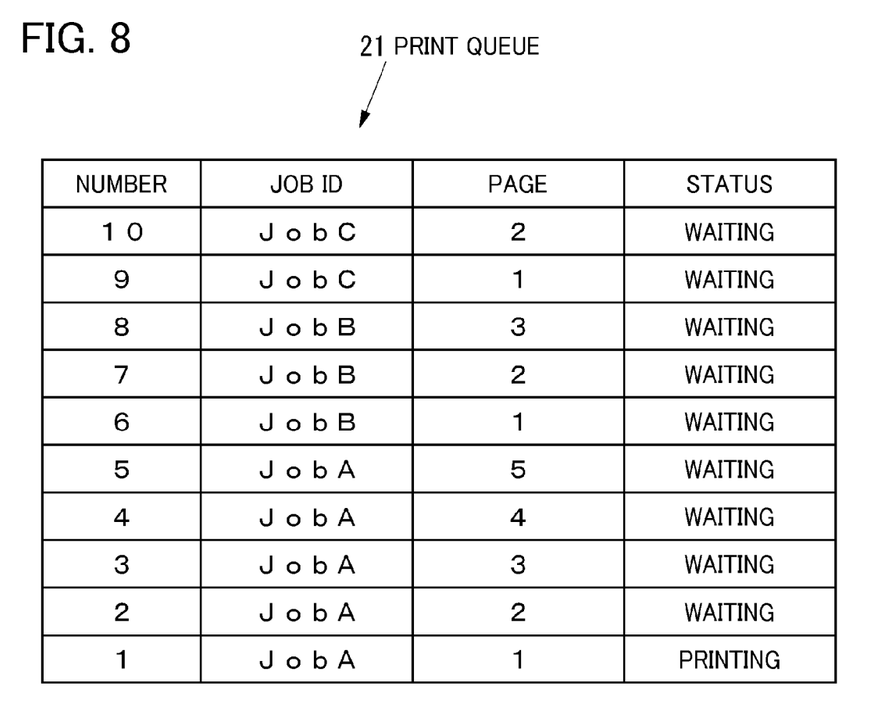
FIG. 8 is a table showing an example of contents of the print queue shown in FIG. 1, in a case in which the print jobs are written into the print queue.

For example, in a case in which the contents of the print queue 21 are as shown in FIG. 4, when a print job including two pages in total with a job ID "Job C" occurs, the contents of the print queue 21 are changed to contents as shown in FIG. 8, by the operations of the job writing unit 31 as shown in FIG. 7.

Execution of Print

Figure 9:
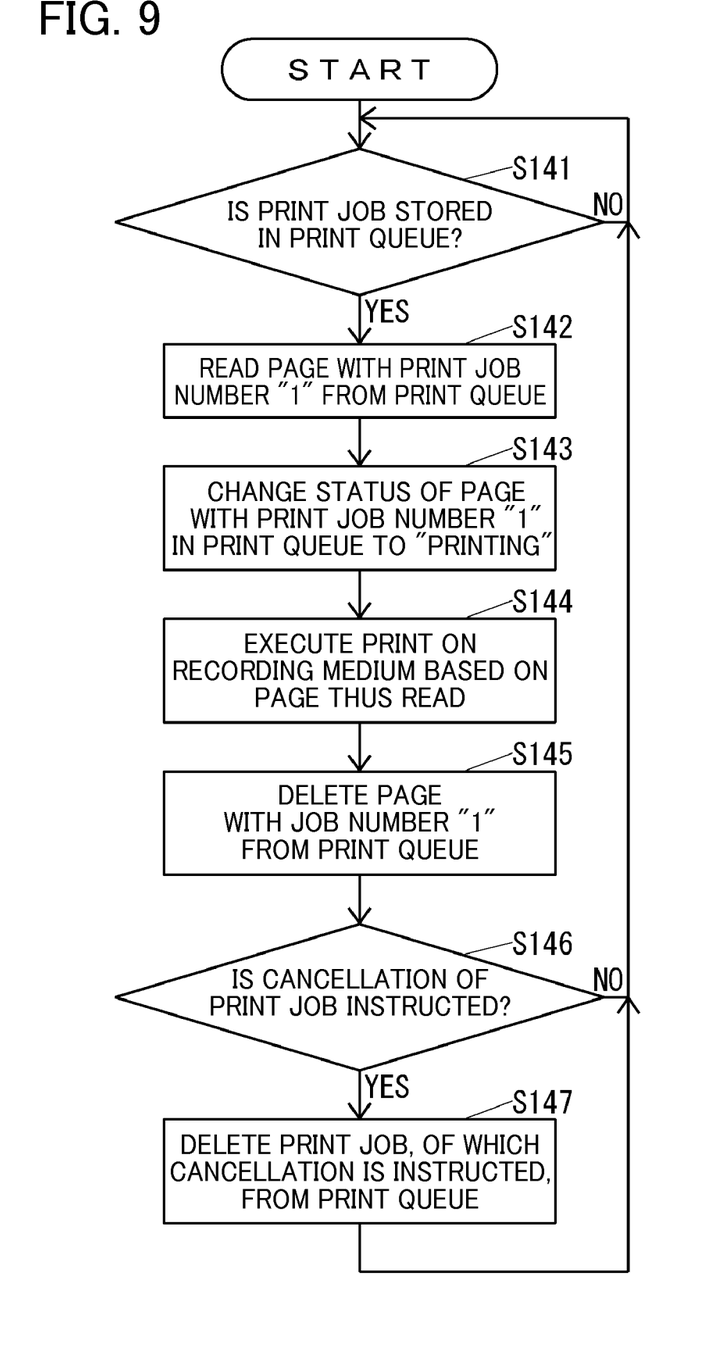
FIG. 9 is a flowchart of operations of an engine controller shown in FIG. 1, in a case of executing print.

FIG. 9 is a flowchart of operations of the engine controller 20 when executing print.

As shown in FIG. 9, the print execution unit 22 of the engine controller 20 continues determination as to whether a print job is stored in the print queue 21, until determining that a print job is stored in the print queue 21 (S141).

In a case in which the print execution unit 22 determines that a print job is stored in the print queue 21 in Step S141, a page with the print job number "1" is read from the print queue 21 (S142).

Subsequently, the print execution unit 22 changes the status of the page with the print job number "1" in the print queue 21 to "printing" (S143).

Subsequently, the print execution unit 22 causes the printer 14 to execute print on the recording medium 91, based on the page read in Step S142 (S144).

When the print executed in S144 is completed, the print execution unit 22 deletes the page with the job number "1" from the print queue 21 (S145). Here, after deleting the page with the print job number "1" from the print queue 21, the print execution unit 22 shifts the data of all the print job numbers in the print queue 21 by one in a decremental manner. More specifically, the print execution unit 22 shifts the data of the print job numbers 2, 3, 4, 5 and so on in the print queue 21 to the data of the print job numbers 1, 2, 3, 4 and so on, respectively.

Figure 10A:
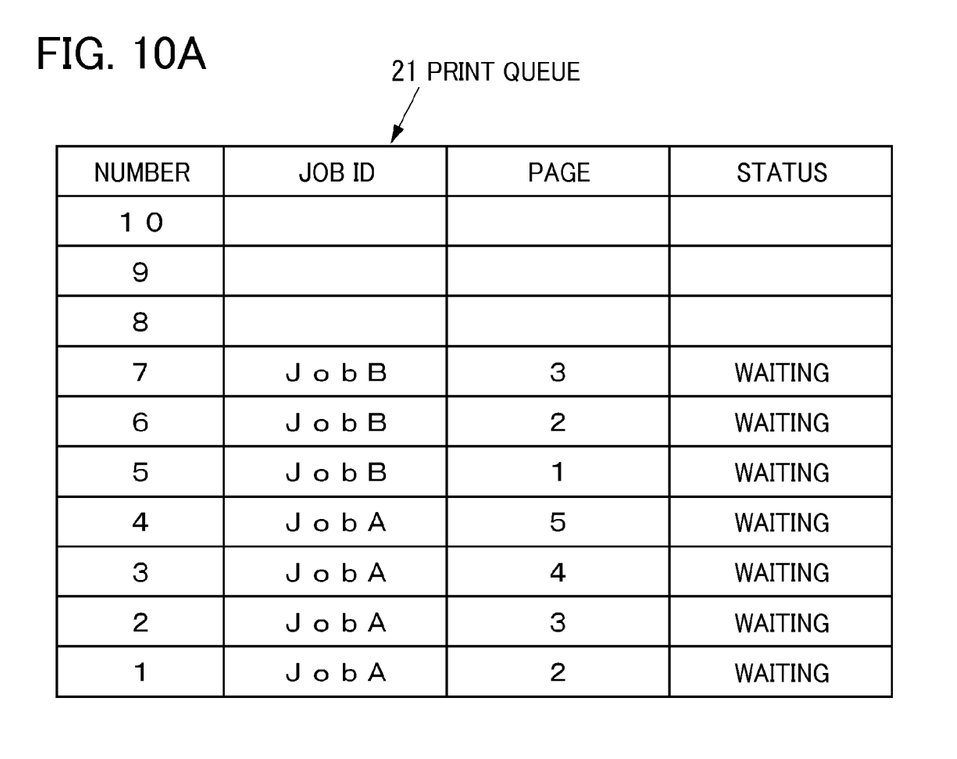
FIG. 10A is a table showing an example of contents of the print queue shown in FIG. 1, in a case in which print was executed.

For example, in a case in which the contents of the print queue 21 were as shown in FIG. 4 in S143, the contents of the print queue 21 will be as shown in FIG. 10A in S145.

After the processing in S145, the print execution unit 22 determines whether the main controller 30 instructed cancellation of a print job (S146).

In a case in which the print execution unit 22 determines that the main controller 30 instructed cancellation of a print job in Step S146, the print job being instructed to be cancelled by the main controller 30 is deleted from the print queue 21 (S147). Here, after the print job being instructed to be cancelled by the main controller 30 is deleted from the print queue 21, in a case in which the print queue 21 includes data of a print job(s) following the deleted print job, the print execution unit 22 shifts the data of the print job numbers in a decremental manner.

Figure 10B:
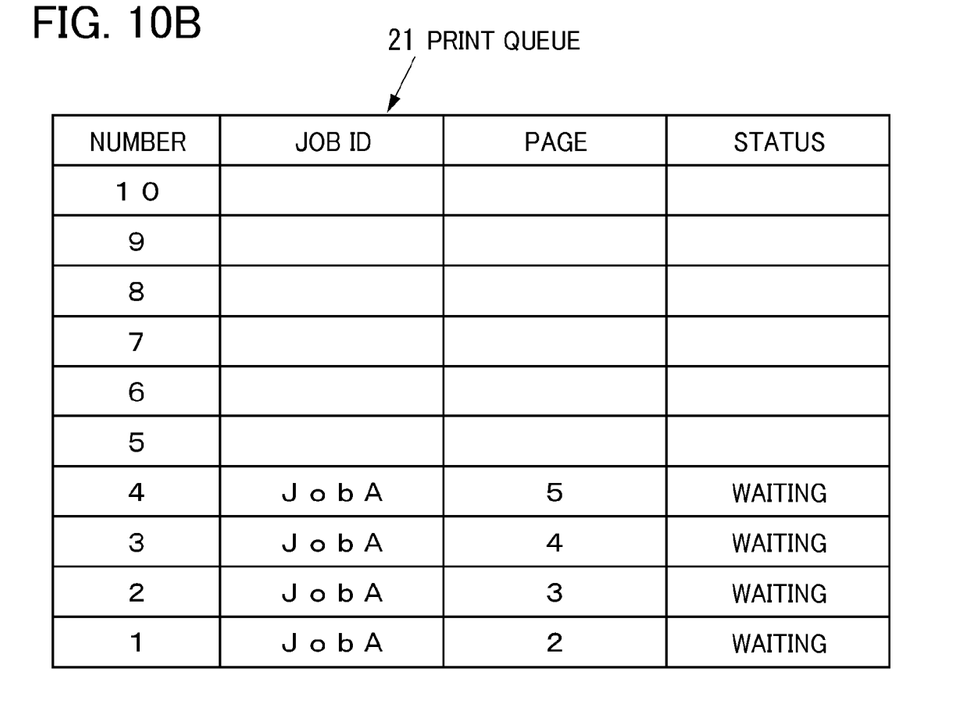
FIG. 10B is a table showing an example of contents of the print queue shown in FIG. 1, in a case in which a print job is cancelled.

For example, in a case in which the contents of the print queue 21 were as shown in FIG. 10A in S145, when the main controller 30 instructs cancellation of the print job with the job ID "Job B", the contents of the print queue 21 will be as shown in FIG. 10B in S147.

In a case in which the print execution unit 22 determines that the main controller 30 does not instruct cancellation of a print job in Step S146, or in a case in which the processing in Step S147 is completed, the processing in Step S141 is executed again.

As shown in FIG. 9, in addition to a case in which a print job of currently executed printing is cancelled from among the print jobs stored in the print queue 21, also in a case in which a print job other than the print job of currently executed printing is cancelled from among the print jobs stored in the print queue 21, the print execution unit 22 suspends the printing (S144) while the print job is being cancelled (S147).

As described above, the MFP 10 changes the maximum number of storable pages of the print queue 21, based on the connected state of the medium feed unit 50 and the post processing unit 70 that are the extension devices affecting the length of the conveyance path 10a of the recording medium 91. Therefore, the possibility of suspension of print due to cancellation of a print job other than a print job of currently executed printing can be reduced as compared to conventional cases.

Although the MFP 10 changes the maximum number of storable pages of the print queue 21, the printing capability equivalent to that of conventional image forming apparatuses can be maintained, as long as the maximum number of storable pages thus changed is appropriately set in accordance with the actual length of the conveyance path 10a of the recording medium 91.

Since the MFP 10 stores the corresponding relationship 13a per se, in a case of changing the maximum number of storable pages of the print queue 21, communication with external devices can be unnecessary.

The MFP 10 executes change of the maximum number of storable pages of the print queue 21 on startup, but may execute the change anytime other than startup time.

Second Embodiment

First of all, descriptions are provided for a configuration of a network system according to the present embodiment.

Figure 11:
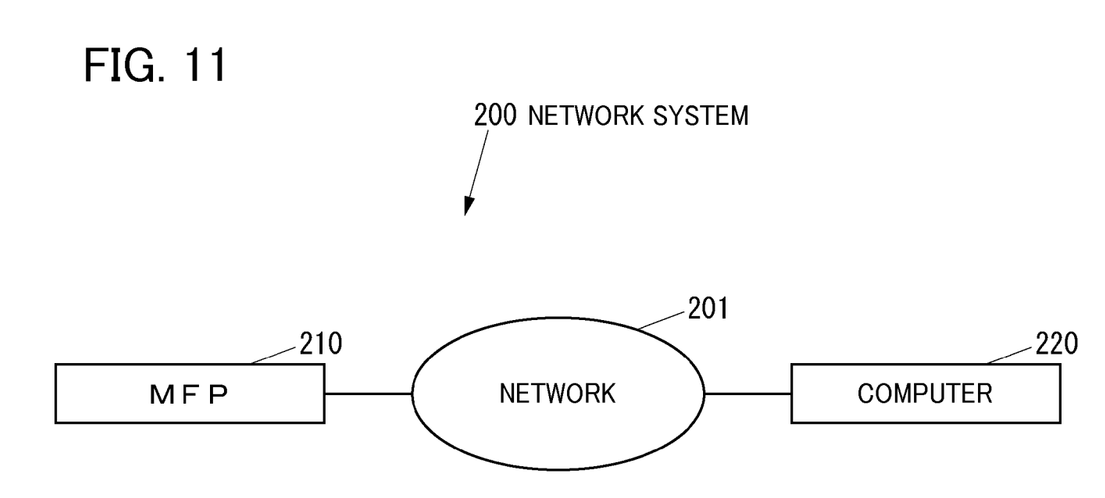
FIG. 11 is a block diagram of a network system according to a second embodiment of the present disclosure.

FIG. 11 is a block diagram of a network system 200 according to the present embodiment.

As shown in FIG. 11, the network system 200 includes: an MFP 210 as an image forming apparatus; and a computer 220 outside the MFP 210. The MFP 210 and the computer 220 are connected so as to be capable of communicating with each other via a network 201 such as a LAN and the Internet.

A configuration of the MFP 210 is similar to the configuration of the MFP 10 according to the first embodiment (see FIG. 1), except that the corresponding relationship 13a (see FIG. 1) is not provided to the MFP 210.

The computer 220 stores a corresponding relationship similar to the corresponding relationship 13a.

Next, descriptions are provided for operations of the network system 200.

The MFP 210 executes operations identical to the operations of the MFP 10 according to the first embodiment, except for the processing in S102 (see FIG. 5).

A maximum-number-of-storable-pages changing unit of the MFP 210 obtains the maximum number of storable pages corresponding to the connected state detected in S101, based on the corresponding relationship stored in the computer.

The image forming apparatus of the present disclosure is the MFP in each of the abovementioned embodiments, but the image forming apparatus is not limited thereto, and may be another image forming apparatus such as a specialized printing machine, a specialized facsimile machine or a specialized copying machine, instead of the MFP. The present disclosure can be applied to an image forming method.

The invention claimed is:

1. An image forming apparatus, comprising:
   a print queue that stores print jobs on a page basis;
   a job writing unit that writes the print jobs into the print queue;
   a print execution unit that executes print on a recording medium based on a page being sequentially read from the print queue, wherein the print execution unit suspends execution of the print in a case in which a print job other than a print job of currently executed printing is cancelled from among the print jobs stored in the print queue;
   a connected-state detection unit that detects a connected state of extension devices affecting a length of a conveyance path of the recording medium; and
   a maximum-number-of-storable-pages changing unit that changes a maximum number of storable pages, which is a maximum number of pages that can be stored in the print queue, wherein the maximum-number-of-storable-pages changing unit changes the maximum number of storable pages, based on the connected state detected by the connected-state detection unit.

2. The image forming apparatus according to claim 1, further comprising:
   a corresponding-relationship storage unit that stores a corresponding relationship of the connected state and the maximum number of storable pages,
   wherein the maximum-number-of-storable-pages changing unit changes the maximum number of storable pages, based on the connected state detected by the connected-state detection unit, and on the corresponding relationship stored in the corresponding-relationship storage unit.

3. An image forming method, comprising:
   a job writing step of writing print jobs into a print queue that stores the print jobs on a page basis;
   a print executing step of executing print on a recording medium based on a page being sequentially read from the print queue, wherein the print executing step suspends execution of the print in a case in which a print job other than a print job of currently executed printing is cancelled from among the print jobs stored in the print queue;
   a connected-state detecting step of detecting a connected state of extension devices affecting a length of a conveyance path of the recording medium; and
   a maximum-number-of-storable-pages changing step of changing a maximum number of storable pages, which is a maximum number of pages that can be stored in the print queue, wherein the maximum-number-of-storable-pages changing step changes the maximum number of storable pages, based on the connected state detected in the connected-state detecting step.

4. The image forming method according to claim 3,
   wherein the maximum-number-of-storable-pages changing step changes the maximum number of storable pages, based on the connected state detected in the connected-state detecting step, and on a corresponding relationship stored in a corresponding-relationship storage unit that stores a corresponding relationship of the connected state and the maximum number of storable pages.

* * * * *